May 23, 1939.  W. N. BOOTH  2,159,881
WHEEL COVER
Filed Nov. 21, 1934    3 Sheets-Sheet 2
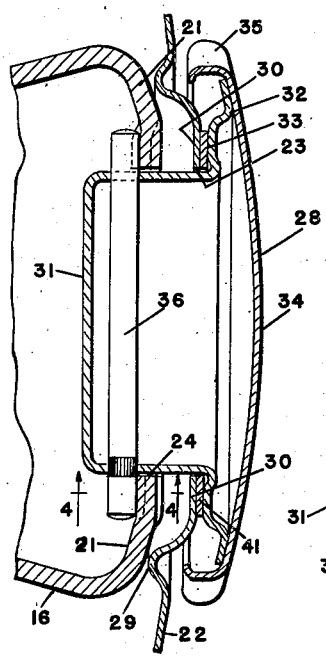
FIG.3.
FIG.4.
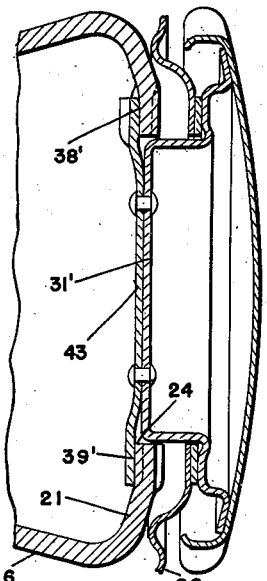
FIG.8.
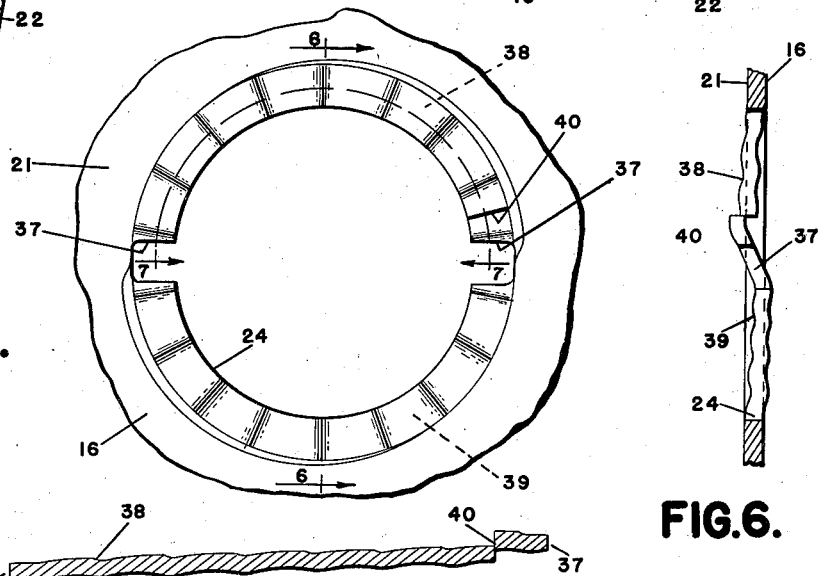
FIG.5.
FIG.6.
FIG.7.
INVENTOR
WILLIAM N. BOOTH
BY *Whittemore Hulbert*
*Whittemore & Belknap*
ATTORNEYS May 23, 1939.  W. N. BOOTH  2,159,881
WHEEL COVER
Filed Nov. 21, 1934  3 Sheets-Sheet 3
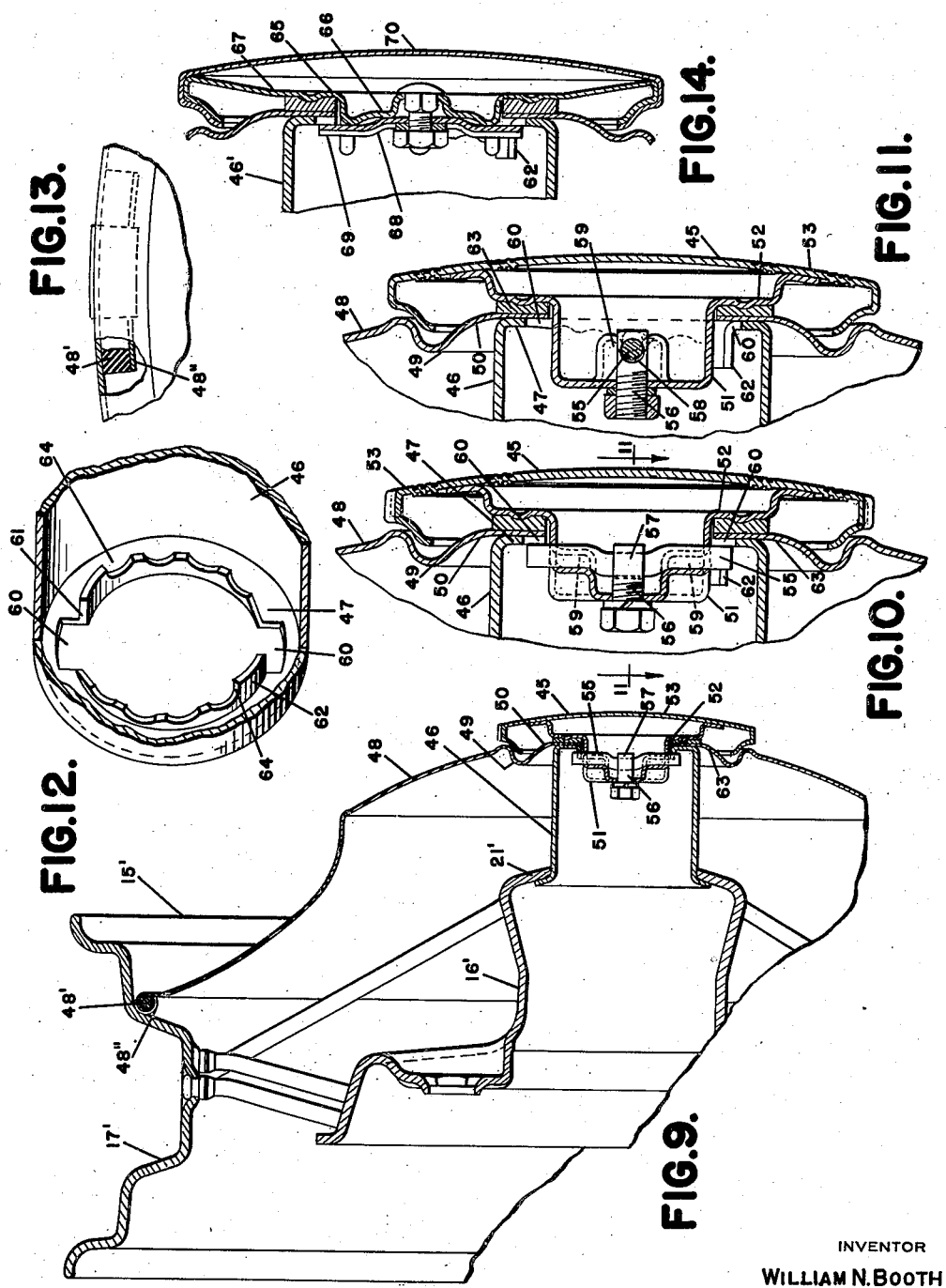
INVENTOR
WILLIAM N. BOOTH
BY
ATTORNEY Patented May 23, 1939

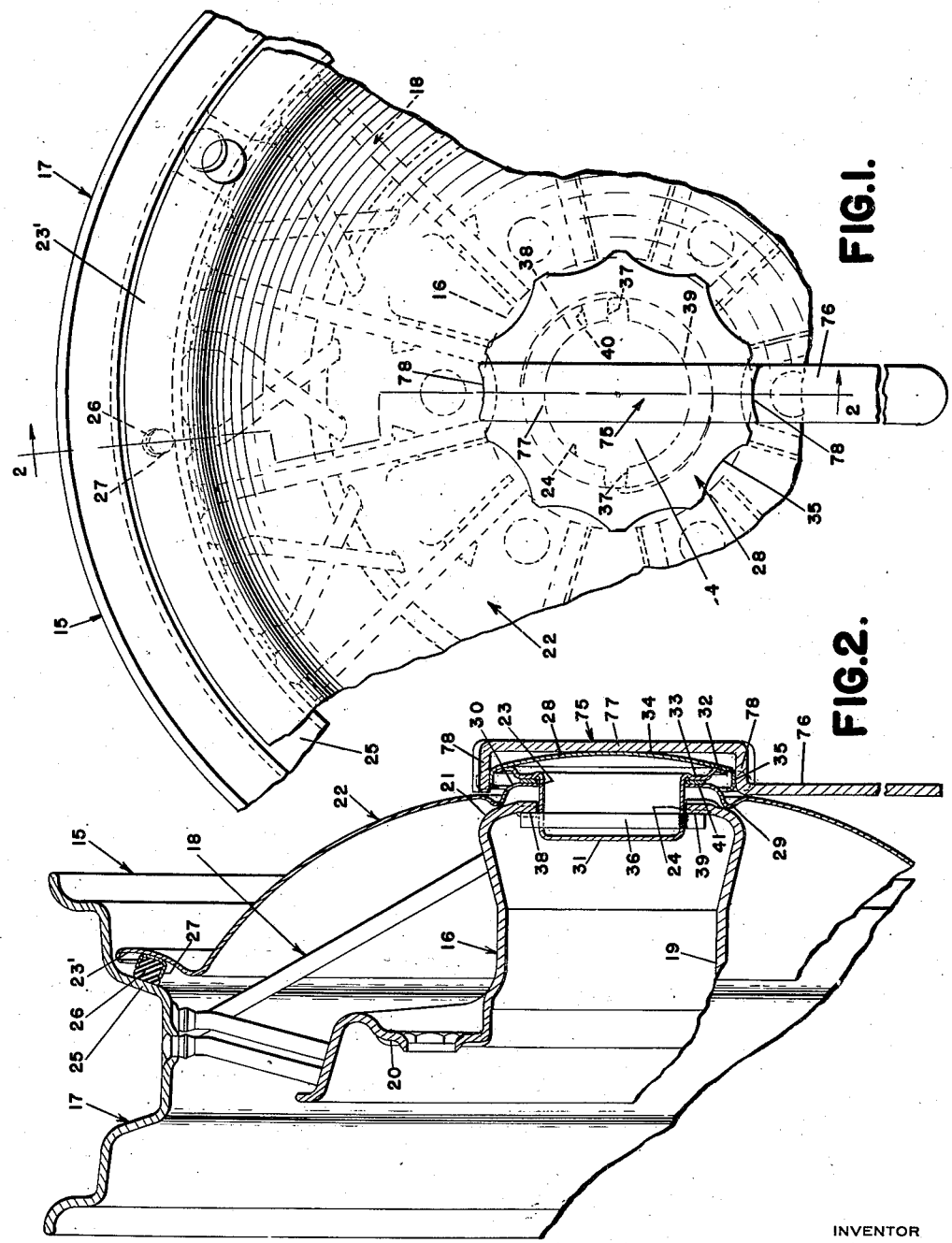

2,159,881

UNITED STATES PATENT OFFICE 2,159,881

WHEEL COVER

William N. Booth, Detroit, Mich., assignor to Kelsey-Hayes Wheel Company, Detroit, Mich., a corporation of Delaware Application November 21, 1934, Serial No. 754,170

7 Claims. (Cl. 301—37)

This invention relates generally to vehicle wheels and refers more particularly to improved cover plates and hub cap constructions for vehicle wheels.

One of the principal objects of this invention is to simplify, render more efficient and improve generally the means for attaching cover plates to vehicle wheels. In accordance with this invention the cost of equipping vehicle wheels with cover plates is reduced to a minimum, and the latter may be readily applied to or removed from the wheels with little or no more effort than is ordinarily required to detach the conventional vehicle wheel hub caps.

The present invention contemplates obtaining the result previously set forth by providing a hub cap readily detachably mounted upon the vehicle wheel and having a portion engageable with the cover plate to secure the same in place upon the wheel.

Another object of this invention resides in the provision of a construction wherein the cover plate and hub cap form an assembly capable of being readily attached to and removed from the wheel as a unit.

A further advantageous feature of this invention consists in the provision of an adapter for a vehicle wheel having means at the forward end for removably securing a hub cap thereto and cooperating with the hub cap to secure differently shaped disks or cover plates to the vehicle wheel.

In addition to the foregoing, the present invention contemplates improvements in hub cap constructions for vehicle wheels and in the manner of securing the hub caps to vehicle wheels.

The foregoing features, as well as other objects of this invention, will be made more apparent as this description proceeds, especially when considered in connection with the accompanying drawings, wherein:

Figure 1 is a fragmentary front elevational view of a vehicle wheel equipped with a cover plate and hub cap assembly constructed in accordance with this invention;

Figure 2 is a sectional view taken substantially on the plane indicated by the line 2—2 on Figure 1;

Figure 3 is an enlarged fragmentary sectional view of a portion of Figure 2, featuring the hub cap in the manner in which the latter functions to secure a cover plate to the vehicle wheel;

Figure 4 is a fragmentary sectional view taken substantially on the plane indicated by the line 4—4 on Figure 3;

Figure 5 is an elevational view of a portion of the nose of the hub shell;

Figure 6 is a cross sectional view taken on the line 6—6 on Figure 5;

Figure 7 is a sectional view illustrating a development of the cam means provided on the nose of the shell for securing the cap and cover plate assembly thereto;

Figure 8 is a view similar to Figure 3 showing a slightly modified form of hub cap;

Figure 9 is a view similar to Figure 2 showing another modification of this invention;

Figure 10 is a fragmentary enlarged sectional view of the cup shown in Figure 9 and illustrating the position of the same relative to the adapter when the former is initially engaged with the latter.

Figure 11 is a cross section view through the cap taken on the line 11—11 of Figure 10 and showing the position of the cap relative to the adapter when the former has been turned to its locked position;

Figure 12 is a perspective view, partly broken away, of the adapter employed in association with the hub shell of the wheel featured in Figure 9;

Figure 13 is a fragmentary plan view of the periphery of the cover plate;

Figure 14 is a view similar to Figure 10 showing still a further modified form of hub cap construction.

Referring now to the drawings and with special reference to the embodiments of the invention featured in Figures 1 to 7 inclusive, it will be noted that I have illustrated in Figure 2 a vehicle wheel 15 having a hub shell 16 and having a tire carrying rim 17 supported from the shell by means of a wheel body 18. For the purpose of illustrating this invention I have shown the wheel body 18 as comprising a plurality of wire spokes, although it will be apparent as this description proceeds that the wheel body may be of the metal spoked or disk types.

The hub shell 16 comprises a barrel portion 19 having an outwardly extending bolting-on flange 20 at the rear end, and having an inwardly extending annular flange 21 at the forward end thereof forming the nose portion of the shell. The hub shell 16, as well as the wheel body 18, is concealed by means of a disk or cover plate 22 having a centrally arranged opening 23 registrable with the opening 24 in the front end of the hub shell and corresponding substantially in diameter to this latter opening. The cover plate is provided with an outwardly extending flange 23' at the periphery thereof adapted to assume a position at the front side of the wall 25 of the rim 17 and having yieldable pads 26 secured at circumferentially spaced points to the rear surface of the flange 23' for engaging the front surface of the wall 25. In the illustrative embodiment of the invention featured in Figures 1 to 7 inclusive, the pads 26 are shown as formed of rubber and are secured to the cover plate 22 by means of cup-shaped retainers 27 welded or otherwise fixed to the inner surface of the flange 23' on the cover plate.

The cover plate 22 is secured under compression to the vehicle wheel with the pads 26 pressed against the front wall 25 of the rim 17 by means of the hub cap 28 for the shell 16. As shown in Figure 2, the central portion 30 of the cover plate 22 immediately surrounding the opening 23 is spaced in advance of the nose 21 and is encircled by an annular inwardly extending bead 29. The bead 29 serves to stiffen the portion 30 of the cover plate and functions to distribute the compressive stress throughout the entire area of the plate when the portion 30 is urged rearwardly by the hub cap, in the manner to be presently described. In detail, the hub cap 28 comprises a cup-shaped member 31 insertable through the opening 23 in the cover plate and having an outwardly extending flange 32 at the forward end thereof provided with an annular seat 33 for engagement with the portion 30 of the cover plate. The cup-shaped member 31 is concealed by a disk 34 secured to the flange 32 and having the peripheral portions 35 bent axially rearwardly in the manner clearly shown in Figure 3. If desired, the flange 35 may be scalloped, as shown in Figure 2, to permit the cap to be conveniently grasped for manipulation. The hub cap 28 is secured to the nose of the hub shell by means of a pin 36 extending through the cup-shaped member 31 adjacent the base thereof and permanently secured to this member with the extremities projecting outwardly beyond the cylindrical side wall thereof. In the present instance, the cover plate is assembled with the hub cap prior to securing the pin to the cup-shaped member so that the cover plate and hub cap form a unitary assembly.

As shown in Figure 5, the nose 21 of the hub shell 16 is provided with diametrically opposed slots 37 of sufficient dimension to permit the opposite end portions of the pin 26 to be extended through the nose 21 from the front side of the shell. From Figure 6, it will be noted that the portion of the nose 21 immediately adjacent the opening 24 through the shell is fluted and is formed to provide diametrically opposed cam surfaces 38 and 39. The cam surface 38 is gradually tapered rearwardly from the left-hand slot 37 as viewed in Figure 5, while the cam surface 39 is gradually tapered rearwardly from the right-hand slot 37. The arrangement is such that when the hub cap 28 is turned in a clockwise direction after the extremities of the pin 26 have been inserted through the slot 37, the hub cap is drawn inwardly by the cam surfaces on the nose of the shell, and in so doing tends to flex the portion 30 of the cover plate rearwardly. The degree of taper of the cam surfaces is determined to afford the extent of rearward movement of the hub cap required to place the compression on the cover plate 22 necessary to effectively secure the latter to the wheel. It will, of course, be apparent that the corrugations on the cam surfaces will serve to prevent accidental turning of the hub cap and, if desired, a suitable stop 40 may be provided on the nose to limit the extent of movement of the hub cap in a clockwise direction relative to the cam surfaces. The stop may be formed by shearing the nose at the place designated in Figure 5, and deflecting the portion of the nose at one side of the line of shear laterally inwardly.

In order to avoid a metal-to-metal contact between the cover plate and hub cap, a suitable non-metallic washer 41 may be interposed between the portion 30 of the cover plate and adjacent seat 33 on the hub cap. It will also be apparent that the washer 41 is assembled with the hub cap 28 prior to securing the pin 36 thereto, and accordingly, forms a part of the hub cap and cover plate assembly.

In Figure 8 of the drawings, I have illustrated a slightly modified form of hub cap. As shown in this figure, the pin 36 is omitted and the function of the latter is performed by a strip 43 riveted or otherwise permanently secured to the base of the cup-shaped member 31'. The free ends of the strip 43 project beyond the cylindrical side wall of the cup-shaped member and cooperate with the cam surfaces 38' and 39' to secure the hub cap and cover plate to the vehicle wheel in the same manner previously set forth in connection with the first described form of this invention.

In Figures 9 to 14 inclusive, I have shown the manner in which a cover plate may be secured to a conventional hub shell. The vehicle wheel 15' may be identical in construction to the wheel 15 with the exception that the nose 21' of the hub shell 16' need not be specially fashioned for cooperation with the hub cap to secure the latter thereto. As shown particularly in Figure 9, the hub cap 45 is secured to the hub shell 16' through the medium of an adapter 46 having the rear end extending through the nose 21' of the shell and permanently secured to the rear side of the nose in any suitable manner. The forward end of the adapter is provided with an inwardly extending annular flange 47 forming an abutment for the central portion of the cover plate 48 and the hub cap 45 cooperates with suitable cam means on the adapter to clamp the central portion 50 of the cover plate to the inwardly extending flange 47. It is to be understood that prior to clamping the central portion of the cover plate to the forward end of the adapter, the former assumes a position slightly in advance of the latter end of the adapter and, as in the first described form of the invention, is encircled by an annular stiffening bead 49 serving to distribute the compressive stress over the entire area of the bead when the central portion 50 is clamped against the forward end of the adapter.

As pointed out above, the cover plate is clamped to the adapter by means of the hub cap 45, and in the present instance the latter comprises a substantially cup-shaped member 51 insertable into the adapter through the forward end thereof, and having an outwardly extending annular flange 52 cooperating with the inwardly extending flange 47 on the adapter to clamp the portion 50 of the cover plate therebetween. The periphery of the flange 52 is fashioned to provide for securing a finishing disk 53 to the cup-shaped member, and the diameter of the disk 53 is such as to conceal the annular bead 49.

The hub cap 45 is detachably secured to the adapter by means of a pin 55 extending through aligned openings in opposite side walls of the cup-shaped member and having the extremities thereof projecting beyond the latter walls in the manner clearly shown in Figure 10. The pin is secured to the base of the cup-shaped member by means of a bolt 56 having a shank portion 57 extending axially through the base of the cup-shaped member into the latter and having an opening 58 therethrough for receiving the pin 55. It will be apparent from both Figures 10 and 11 that the cup-shaped member is fashioned to provide shoulders 59 on opposite sides of the pin 55 to take the side thrusts imparted to the pin upon actuation of the hub cap.

Referring now to Figure 12, it will be noted that the inwardly extending flange 47 on the adapter is formed with diametrically opposed slots 60 therethrough of sufficient dimension to permit the passage of the extremities of the pin 55 into the adapter from the front side of the latter. It will also be observed from Figure 12, that the marginal edges of the flange 47 on opposite sides of the slots are provided with axially extending flanges 61 and 62. The marginal edge of the flange 61 tapers gradually rearwardly from the lower slot 60 shown in Figure 12, to the upper slot, while the corresponding edge of the flange 62 tapers gradually rearwardly from the upper slot to the lower slot, and the edges of both flanges are scalloped for locking engagement with the extremities of the pin 55. The arrangement is such that when the hub cap 45 is turned in a clockwise direction after the extremities of the pin have been extended into the adapter through the slots 60, the hub cap will be drawn rearwardly by the tapered or inclined marginal edges of the flanges 61 and 62 into clamping engagement with both the central portion 50 of the cover plate and the forward end of the adapter.

As previously stated, when the cover plate is positioned upon the wheel, the resilient portion 47 will be spaced axially forwardly from the flange 47 on the adapter so that when the hub cap is clamped to the adapter, the cover plate will be secured under compression to the vehicle wheel. As in the first described form of the invention, a suitable non-metallic washer 63 may be assembled upon the hub cap between the portion 50 of the cover plate and flange 52 on the cap in order to avoid any possibility of squeaks. Provision is also made in the present embodiment of the invention to limit rotation of the hub cap in a clockwise direction, and this is accomplished by suitable stops 64 located in the path of travel of the extremities of the pin 55.

The periphery of the cover plate 48 is provided with cirumferentially spaced yieldable members 48' for engagement with the front wall of the rim 17'. In the present instance, the members 48' are formed of rubber and are secured to the cover plate by crimping portions 48'' of the periphery of the plate around the opposite ends of the members in the manner clearly shown in Figure 13.

In Figure 14, I have shown a slightly modified form of hub cap for use in connection with the adapter 46 previously described. As shown in Figure 14, the hub cap comprises a disk 65 having a centrally disposed cup-shaped portion 66 fashioned to extend through the central opening in the cover plate into the adjacent opening formed in the adapter 46', and having a portion 67 extending outwardly at the front side of the cover plate for securing the latter to the adapter. Secured to the rear side of the cup-shaped portion 66 is a strip 68 having the extremities 69 projecting beyond the cup-shaped portion and cooperating with the rearwardly tapering cam faces on the adapter 46' to secure the hub cap and cover plate to the adapter. As in the foregoing described forms of the invention, the cup-shaped member is concealed by a disk 70 secured to the outwardly extending flange 67 on the cup-shaped member in any suitable manner.

Thus from the foregoing, it will be observed that while each of the embodiments differ structurally from each other, all of the various constructions are extremely simple and are capable of being inexpensively manufactured. It will also be apparent that in each embodiment of the invention provision is made for effectively securing cover plates under compression to vehicles wheels by the hub caps of the vehicle wheels. In addition, it will be apparent that with each of the modifications selected herein for the purpose of illustration, the cover plate and hub cap form an assembly capable of being readily attached to or removed from the vehicle wheel as a unit. With reference to removing and assembling the cover plate and hub cap, attention is again called to the fact that in each embodiment of the invention, the periphery of the hub cap is scalloped so as to permit the same to be readily grasped by one hand of an operator, or if desired, permit the use of a tool of the type shown in Figures 1 and 2 by the reference character 75. The tool is of simple construction having a handle 76 and having a U-shaped portion 77 of sufficient dimension to receive the hub cap between the leg portions 78. In this connection it will be noted that the leg portions are transversely curved in such a manner as to fit the diametrically opposed scalloped portions of the cam between the crests of the scallops. The construction is such that when the tool is assembled with the hub cap in the manner shown in Figures 1 and 2, relative rotation between the tool and cap is prevented and the cap may be readily removed from or attached to the hub by manipulation of the tool.

What I claim as my invention is:

1. The combination with a vehicle wheel having a rim and a hub portion, of a centrally apertured cover plate for the front side of the wheel having a peripheral portion engaging the front side of the rim and having a portion spaced radially outwardly from the marginal edges of the central opening engageable with the front side of the hub, said cover plate also having the marginal edge portions of the aperture spaced in advance of the front side of the hub portion, a hub cap having an outwardly extending portion engageable with the front side of the portion of the cover plate spaced in advance of the hub and having another portion extending through the central aperture in the cover plate, and means for securing the cap to the hub portion of the wheel and for tensioning the marginal edge portions of the aperture in the cover plate to clamp said cover plate to the front side of the hub.

2. The combination with a vehicle wheel having a rim and a hub portion, of a centrally apertured cover plate for the front side of the wheel having a peripheral portion engaging the front side of the rim and having a portion spaced radially outwardly from the marginal edges of the aperture engageable with the hub, said cover plate also having the marginal edge portions of the aperture spaced in advance of the hub portion, a hub cap having an outwardly extending portion engageable with the front side of the portion of the cover plate spaced in advance of the hub and having another portion extending through the central aperture in the cover plate, and cooperating cam means on the last named portion of the cap and hub for securing the former to the latter and for urging the outwardly extending portion of the cap rearwardly to tension the marginal edge portions of the aperture in the cover plate and to clamp the latter to the front side of the hub.

3. The combination with a vehicle wheel having a rim and a hub portion, of a centrally apertured cover plate for the front side of the wheel having a peripheral portion engaging the front side of the rim and having a portion spaced radially outwardly from the marginal edges of the aperture engageable with the hub, said cover plate also having the marginal edge portions of the aperture spaced in advance of the hub portion and encircled by a stiffening rib, a hub cap having an outwardly extending portion engageable with the front side of the portion of the cover plate spaced in advance of the hub and having an axially extending portion insertable through the central aperture in the cover plate, and cooperating cam means on the axially extending portion of the cap and the hub portion responsive to rotation of the cap for securing the latter to the hub portion and for urging the outwardly extending portion of the cap rearwardly to tension the marginal edge portions of the aperture in the cover plate and to clamp the cover plate to the front side of said hub.

4. The combination with a vehicle wheel having a rim member, a hub member and a wheel body member connecting the hub member to the rim member, of a forwardly projecting tubular extension member upon the hub member having an inwardly extending flange at the forward end thereof, a cover plate for the wheel body centrally apertured in registration with the opening through the forward end of the extension member and having the portion thereof surrounding the aperture therethrough positioned opposite the inwardly extending flange at the front side of the latter, a hub cap having an axially extending portion projecting into the tubular extension member through the central aperture in the cover plate and having axially spaced outwardly extending portions cooperating with each other to clamp both the cover plate and hub cap to the extension member.

5. The combination with a vehicle wheel having a rim member and having a hub connected to the rim by a wheel body, of a centrally apertured cover plate for the wheel body having the peripheral portion thereof engaging the front side of the rim and having an annular portion spaced radially outwardly from the marginal edges of the aperture in the cover engageable with the front side of the hub, said cover plate also having the marginal edge portions of the aperture spaced axially forwardly from the front side of the hub, and a hub cap having a portion secured to the hub through the aperture in the cover plate and having another portion at the front side of the marginal edge portion of the cover plate effective upon securing the hub cap to the hub to tension the axially spaced marginal edge portions of the aperture and thereby clamp the adjacent portion of the cover plate to the front side of the hub.

6. The combination with a vehicle wheel having a hub and having a wheel body supported by the hub, of a forwardly projecting extension at the front end of the hub, a hub cap attachable to the front end of the extension and having a radially outwardly extending portion beyond the outer end of said extension, and a cover plate for the wheel body concealing the extension and centrally apertured opposite the extension for receiving a portion of the hub cap, said cover plate having the marginal edge portions of the aperture clamped by the radially outwardly extending portion aforesaid of the hub cap against the front end of said extension.

7. The combination with a vehicle wheel having a hub and a wheel body supported from the hub, a forwardly projecting tubular extension at the front end of the hub and having a radially inwardly extending portion at the forward end thereof, a hub cap having a portion extending into the extension and having axially spaced radially outwardly extending portions positioned on opposite sides of said radially inwardly extending portion of the extension, and a cover plate for the wheel body having a central opening therethrough for receiving the first named portion of the hub cap and having the marginal edges of the opening clamped against the radially inwardly extending portion at the front end of the extension by said axially spaced radially outwardly extending portions of the hub cap.

WILLIAM N. BOOTH.